Oct. 21, 1952　　　H. H. HILLMER ET AL　　　2,614,469
PHOTOPRINTING APPARATUS

Filed Feb. 3, 1949　　　　　　　　　　　　6 Sheets-Sheet 1

Inventor
Herman H. Hillmer
By Henry P. Arent
Arthur H. Sturges
Attorney

Oct. 21, 1952 H. H. HILLMER ET AL 2,614,469
PHOTOPRINTING APPARATUS
Filed Feb. 3, 1949 6 Sheets-Sheet 2

Inventor
Herman H. Hillmer
By Henry P. Arent
Arthur H. Sturges
Attorney

Oct. 21, 1952    H. H. HILLMER ET AL    2,614,469
PHOTOPRINTING APPARATUS

Filed Feb. 3, 1949    6 Sheets-Sheet 4

Inventor
Herman H. Hillmer
By Henry P. Arent
Arthur H. Sturges
Attorney

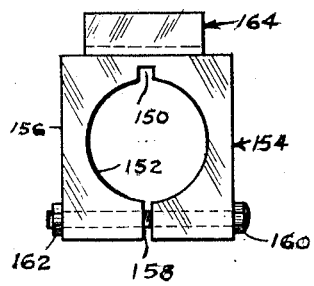
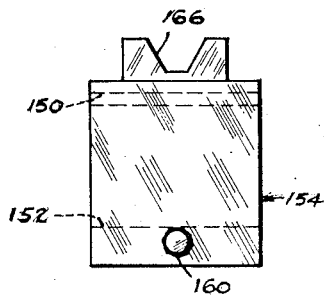
Fig.9.   Fig.10.
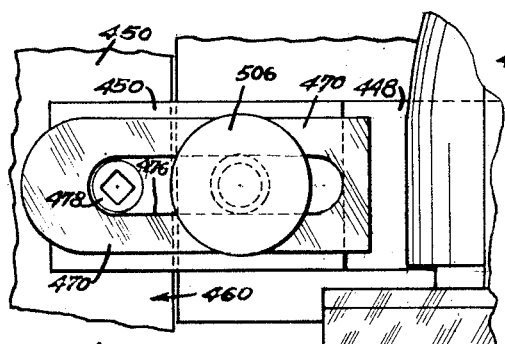
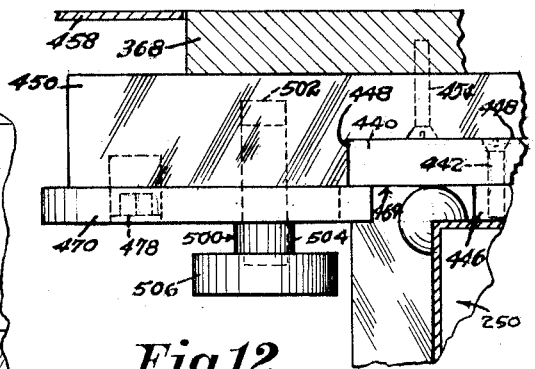
Fig.11.   Fig.12.
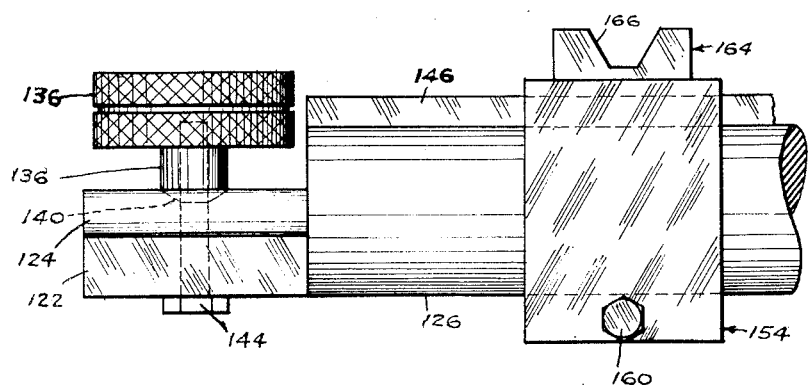
Fig.13.

Patented Oct. 21, 1952

2,614,469

UNITED STATES PATENT OFFICE 2,614,469

PHOTOPRINTING APPARATUS

Herman H. Hillmer and Henry P. Orent, Omaha, Nebr., assignors to Printing Engineers Incorporated, Omaha, Nebr., a corporation of Nebraska Application February 3, 1949, Serial No. 74,323

4 Claims. (Cl. 95—73)

This invention relates to photo-printing and more particularly it is an object of the invention to provide a printing machine for accurately reproducing a single or group of images from a film, plate or the like into a plurality of positions on an image-receiving film, plate or the like.

The general type of machine referred to are known as "step-and-repeat" machines. These machines comprise two oppositely disposed holders for receiving printed material, one of the holders being movable with respect to the other so that a single image from material on one of the holders can be reproduced in a plurality of positions on the material of the other of the holders by successive exposure steps. The success of the reproduction is dependent upon the accuracy of the machine employed for eliminating material waste.

A machine of the type described is shown in the applicants' co-pending patent application titled Printing Apparatus, filed August 1, 1947 and bearing the application Serial Number 765,400, now Patent Number 2,588,385, dated March 11, 1952.

Another object of the invention is to provide improvements on the machine described in the said co-pending application.

A particular object of the invention is to provide a step and repeat machine employing vacuum suction for drawing the negative and positive films together, a particular feature added being that the vacuum is drawn on each of the two pieces of film separately and from opposite sides of the two for securing the same to their respective holders, as distinguished from prior art machines in which vacuum is applied between the two pieces of film for drawing the same together.

Still another object of the present invention is to provide a step-and-repeat machine as described having a double row of stops or detents extending longitudinally and a similar double row of detents extending laterally of the bed plate thereof so that images of different sizes may be placed upon a single film, so that the detents may be arranged on their respective rods in positions for preparing a positive to make labels of different sizes so that the film will thus have applied to it images of different sizes, and so that images may be successively placed lengthwise of the film to a point adjacent the end thereof, and without removing the positive film, images may then be reproduced on the positive film in a direction transversely to the images previously put on, so that a conserving of film is effected.

Still another object of the invention is to provide a machine as described having double rows of detents extending laterally and horizontally of the bed plate to facilitate the applying, to the positive film, images of irregular outline whereby such images may conveniently be made to overlap for having film.

Yet a further object of the invention is to provide a machine as described having a resilient layer placed on the surface of the bed plate.

Still another object of the invention is to provide a stud and slidable lug means for locking the lamphouse of the machine in a position disposed in parallelism with the upper surface of the bed plate thereof.

Still another object of the invention is to provide a machine as described having a lever for raising and lowering the lamphouse and which is particularly provided with means for limiting swinging movements of the lever for limiting downward movements of the lamphouse in order to save wear on the above mentioned resilient upper surface of the bed plate.

Still another object of the invention is to provide adjustment screws in the track supporting blocks of the machine as described so that the said blocks and all mechanism thereabove can be raised and lowered at each corner thereof with respect to the others for adjusting the said plate to a desired position.

Still a further object of the invention is to provide adjustment means for raising and lowering the detent carrying rods to place the same in desired positions with respect to other parts of the machine.

Particular difficulty has been found in two color printing with prior art machines since great accuracy of operation is required to register an image of one color within an image of another color without objectionable overlapping. Overlapping is similarly undesirable although not as noticeable in one color printing.

Machines of the prior art have employed micrometer screws, and the like in an attempt to facilitate the proper positioning of the holders. Considerable waste has been occasioned in their use, however, since the factor of human error is involved. Additionally, such micrometer screws become imperfect through wear.

A further disadvantage of prior art machines has been the relatively crude methods used for attaching printing positives and negatives to the respective holders. Pressure sensitive tape, cementitious material, and paste have been employed with attendant loss of time and with waste resultant from inaccuracy.

It has been found especially difficult and almost impossible with machines of the prior art to truly position a film upon a holder at times when a two or three color reproduction is required. Another disadvantage of such machines has been the employment of a vertically disposed plate or holder to which it is especially difficult to accurately attach film.

It is therefore an object of the present invention to provide a machine which is so constructed that accurate results may be obtained therefrom.

A particular object of the invention is to provide a machine as described having the accuracy of operation required to register an image of one color within an image of another color without objectionable overlapping.

Another object of the invention is to provide a machine as described which employs film holders which are normally horizontally disposed during use.

A further object of the invention is to provide a machine as described employing vacuum as a more efficient means to secure printing material to the oppositely disposed holders thereof.

Still another object of the invention is to provide a machine for reproducing an image in a plurality of positions which employs detents which may be accurately spaced apart prior to operation and which are not as susceptible to inaccuracy, due to wear, as devices of the prior art.

A still further object of the invention resides in the provision of a mounting for pivotally and slidably carrying one of the holders of the invention in a manner whereby the holder can be swung from a horizontal use position to a vertical position for facilitating the placing of a sheet of printing material thereon.

Yet another object of the invention is to provide a machine as described, one of the holders of which is particularly mounted in a manner adapted to compensate for other inaccuracies and for varying thicknesses of films, plates and the like, to cause oppositely disposed ones of the latter, when in use with the invention, to be pressed against each other for preventing light from entering therebetween.

Yet another object of the invention is to provide a method of and means for accurately and quickly placing image-bearing printing material upon one of the holders of the invention.

Other and still further objects and advantages of the invention will become apparent from the following detailed description of a preferred embodiment thereof.

In the drawings:

Figure 9 is an end elevation of one of a number of like adjustable stop detent members employed;

Figure 10 is a front elevation of one of the said detent members;

Figure 11 is a front elevation of a portion of the lamphouse together with the knurled nut and lug employed for adjusting the position of the lamphouse;

Figure 12 is a top plan view of the parts shown in Figure 11; and

Figure 13 is a frontal elevation of an end portion of one of the detent rods employed showing a detent positioned thereon, and also showing a nut employed for fixing the rod to the upper rails, the latter not being shown in Figure 13.

Figure 1:
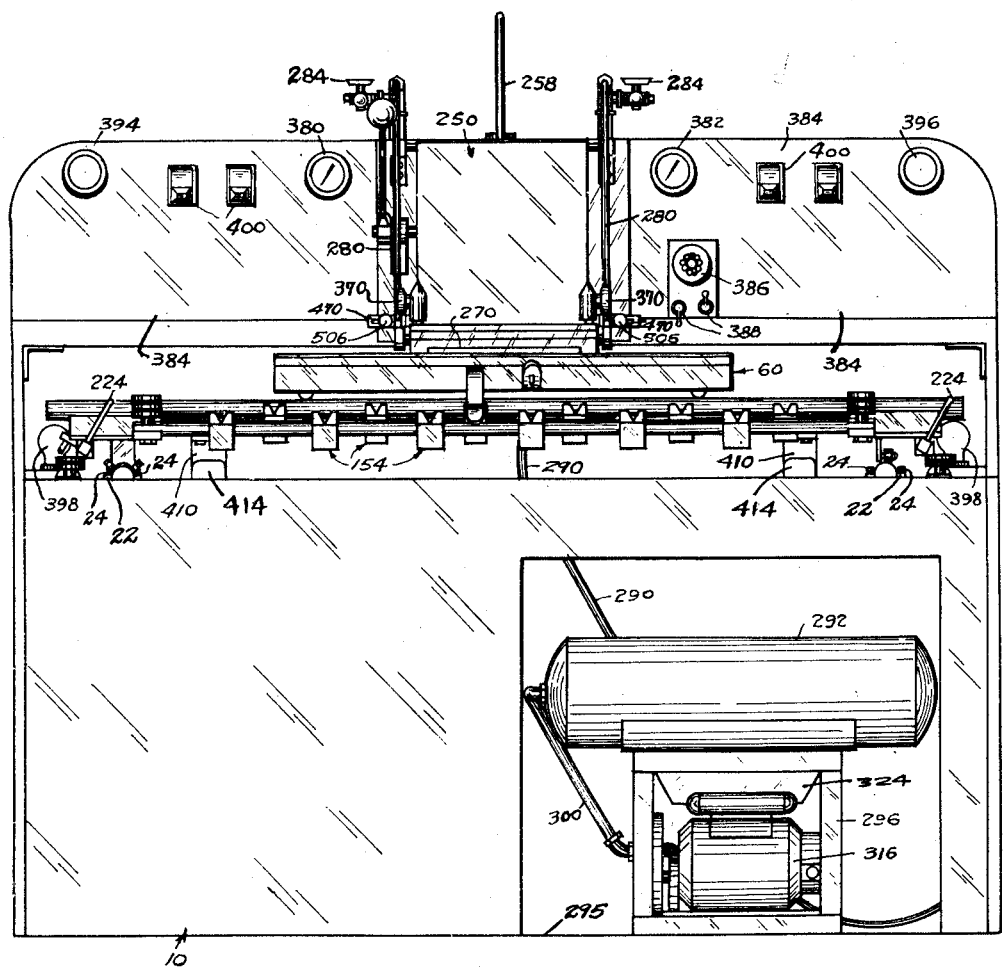
Figure 1 is a frontal elevation of the printing machine of the invention.

The printing machine of this invention includes a frame or support 10. The frame 10 is provided with an elongated platform top 12, best seen in Figure 4.

On the top 12 two parallel lower tracks or transverse rails 20 are mounted. The tracks 20 are supported in blocks 22 upwardly from the top 12 of the frame 10. The blocks 22 may all be provided with set screws 24 if desired as illustrated by the set screws shown in the forward blocks 22. The screws 24 are threadedly received through the blocks 22 and bear against the supporting surface of the frame 10.

The tracks 20 are for the purpose of supporting a frame 40 having legs 42 extending therebeneath. The legs 42 are provided with bifurcated lower ends having supporting axles thereon for rotatably supporting a pair of mutually inclined rollers 44. The rollers 44 are adapted to engage opposite sides of the tops of the two parallel lower tracks 20 for traveling therealong.

The frame 40 is further provided with two other tracks 50 disposed thereabove. The tracks 50 are preferably circular in cross section and are disposed in spaced apart parallelism with each other and at a right angle with respect to the tracks 20.

The purpose of the tracks 20 is to support a bed plate or lower holder, or positive film holder 60 as seen in Figures 1, 2, 4 and 7.

Figure 5:
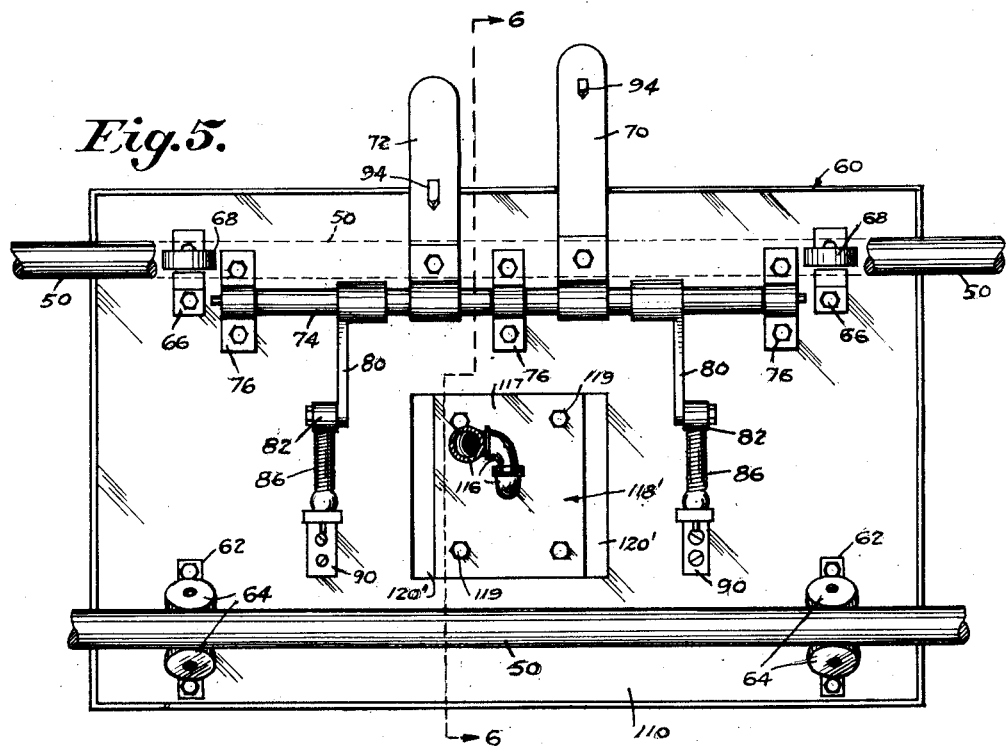
Figure 5 is a bottom-plan view of the horizontally disposed platform or holder upon the top of which positive photographic material is disposed in operation, portions of the tracks or rails upon which the platform travels being broken away.

The bed plate 60 is best seen in Figure 5. The underside of the bed plate 60 is provided at its rearward end with two roller brackets 62 at the back corners of the bed plate. The roller brackets 62 are adapted to rotatably carry rollers 64 which engage the rearwardmost upper track member 50 for supporting the bed plate 60 thereon.

At the forward side of the bed plate 60 and on the underneath thereof are other roller brackets 62 at the back corners of the bed plate. The roller brackets 62 are adapted to rotatably carry rollers 64 which engage the rearwardmost upper track member 50 for supporting the bed plate 60 thereon.

At the forward side of the bed plate 60 and on the underneath thereof other roller brackets 66 are provided for supporting rollers 68 which are adapted to travel longitudinally along the forwardmost of the upper tracks 50.

Also disposed on the underside of the bed plate 60 and secured thereto are locking dog levers 70 and 72. The latter extend transversely of the bed plate 60 overlapping the forward side thereof. The rearward ends of the levers 70 and 72 are rigidly locked in spaced apart positions to a rotating shaft 74 which latter is rotatably held in bracket 76 to the underside of the bed plate 60.

Also secured to the shaft 74 are two arms 80 which latter are disposed adjacent each of the respective levers 70 and 72. The arms 80 extend rearwardly from the shaft 74 in opposite directions therefrom with respect to the dog arms 70 and 72. At the rearward end of each of the arms 80, the latter are respectively secured each to a pivotally mounted toggle member 82.

Figure 6:
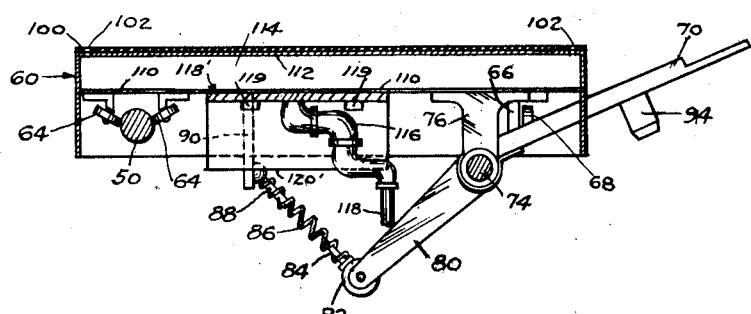
Figure 6 is a view-in-section taken along the line 6—6 of Figure 5.
Figure 7:
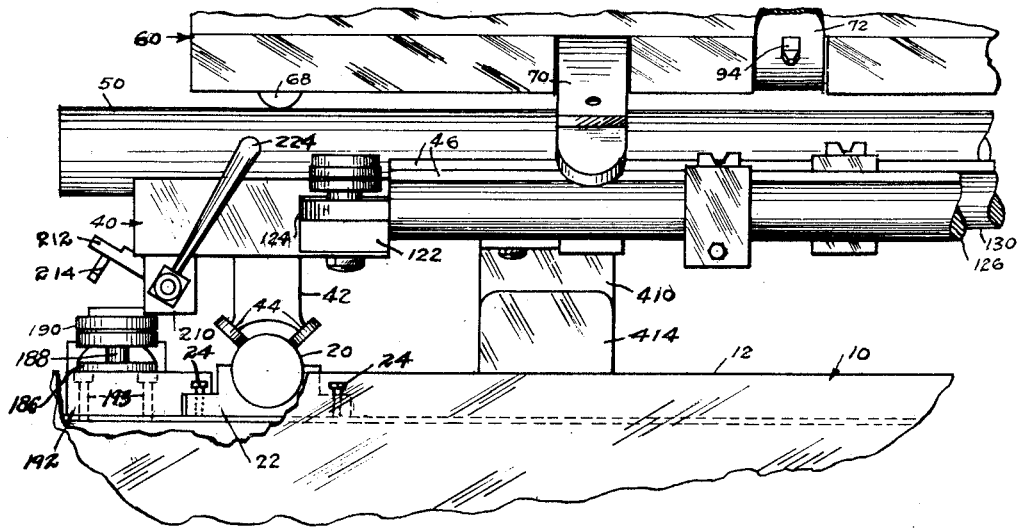
Figure 7 is a detailed frontal elevation of a broken-away end portion of the machine shown adjacent the left-hand end of the machine as it is shown in Figure 1.

The toggle members 82 are provided with a protrusion 84 extending outwardly and rearwardly therefrom as best seen in Figure 6. The protrusions 84 are adapted to pivot in a plane in parallelism with the elongated arms 80. The protrusions 84 are adapted to extend into the centers of the ends of compression springs 86 which latter extend upwardly and rearwardly from the protrusions 84.

Compression springs 86 are engaged at their upper ends by similar protrusions 88 which latter are pivotally secured in any suitable manner to brackets 90 which latter are secured to the underside of the bed plate 60.

As thus described, when the locking dog levers 70 are moved downwardly at their outer ends, the arms 80 move upwardly to a position in which the pivotal connection between the toggle member 82 and the arm 80 passes dead center. When dead center is passed the locking dog levers 70 tend to remain in downward positions, held there by the springs 86. Also, the springs 86 will tend to hold the levers 70 in an upward position at other times as best seen in Figure 6.

The locking dog levers 70 are each provided with a dog 94 protruding downwardly from the underside thereof for engaging detent members later described.

The upper side of the bed plate or lower holder 60 is provided with a layer of resilient material, such as rubber or the like 100. The purpose of the rubber 100 is to permit a tight fit, like a gasketed fit, between the lower holder 60 and the later described upper holder or lamphouse.

The layer of resilient material 100 is provided with a rectangular row of apertures 102. The upper side of the bed plate proper is also provided with a rectangular row of apertures continuous with the apertures 102 or, in other words, forming a part thereof.

The bed plate 60 is provided with a partition 110 extending thereacross and spaced downwardly from the top 112 thereof. The partition 110 joins the side walls of the bed plate 60 for providing a chamber 114 between the partition 110 and the top 112.

The chamber 114 is provided with an aperture through the partition 110 to which a plurality of pipe couplings 116 are secured. The couplings 116 are joined to a pipe 118 which extends to a vacuum tank, as later described, for drawing a vacuum from the chamber 114 and through the apertures 102.

The pipe couplings 116 are secured to the partition 110 in any suitable manner such as by threadedly securing an end coupling 116 to a midportion 117 of a detent bracket 118 which latter is secured to the partition 110 by suitable bolts 119, as best shown in Figure 5.

The detent bracket 118 has two downwardly disposed stop engaging portions 120 for a purpose later described.

Figure 8:
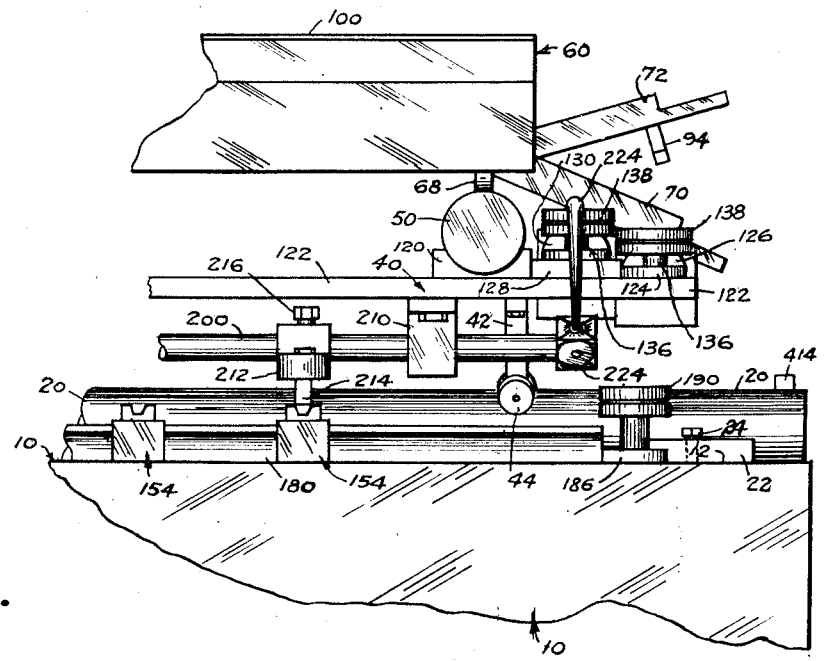
Figure 8 is a detailed end elevation of the parts shown in Figure 7.

The framework 40 includes blocks 120 each having a hollowed upper side for receiving an upper track 50. As best seen in Figure 8, the blocks 120 are secured to suitable carriage plates 122 which, with the tracks 50 provide a carriage forming another portion of the framework generally indicated at 40.

Portions of the plate 122 extend forwardly from the blocks 120 as best seen in Figure 8, and for the purpose of upholding a narrow end portion 124 of a detent supporting rod 126 and for the further purpose of upholding the narrow end 128 of a detent supporting rod 130. The said detent supporting rods 126 and 130 are disposed one forwardly of the other in parallel positions in front of the machine.

The ends 124 and 128 are themselves secured to the plate 122 by means of bolts 136 having knurled adjustment handles 138 at their upper end.

The bolts 136 are best shown in detail in Figure 13 in which latter is shown that the bolts 136 are provided with narrower lower portions divided from the upper portion by a shoulder indicated in dotted lines at 140, the said shoulders each being provided with inclined surfaces extending downwardly.

The ends 124 of the detent supporting rods 126 and 130 are provided with apertures extending downwardly therethrough for the purpose of receiving the lower ends of the bolts 136. One of the said apertures is shown in dotted lines in Figure 13 and is provided with an inclined upper portion for the reception of the shoulder at the end of the larger diameter upper portion of the bolt 136.

The plate 122 is similarly provided with an aperture shown in Figure 13 so that each bolt 136 projects through an end portion 124 and through the plate 122, so that a nut 144 may be placed upon the lower end of the bolt 136 for rigidly securing the portions 124 and the plate 122 together.

The detent supporting rods 126 and 130 are each of an approximate circular shape in cross section each having longitudinally extending ridge 146 upon their upper side. The ridge 146 is preferably rectangular in cross-section and is adapted to be received in a suitable notch 150 in the wall of the central opening 152 of a detent 154 best shown in Figure 9.

The detents or spacing blocks 154 are all of like construction and are provided with a main body portion 156 which is generally rectangular in outline. The rectangular portions 156 are provided with openings 152 as described and are circular and of approximately the diameter of the detent supporting bars 126 and 130. The main body portions 156 of the detents are each provided with slots 158 extending therethrough from the outside inwardly toward the opening 152 and joining therewith.

The main body portions 156 are further provided with an aperture extending through those two end portions thereof which are disposed on opposite sides of the block 154. The said apertures are for the purpose of receiving a bolt 160 having a nut 162. The bolt 160 is for the purpose of drawing the walls of the slot 158 toward each other for claiming the detent 154 about a detent supporting bar.

On the upper side of each detent 154, the latter is provided with a dog-receiving portion 164 which latter is provided with a suitable substantially V-shape slot 166 having sloping side surfaces in the upper side thereof for receiving a dog 94. The dog-receiving slot 166 of each detent 154 is elongated, having inclined side walls converging downwardly and extends transversely with respect to the axis of the circular opening 152.

Figure 2:
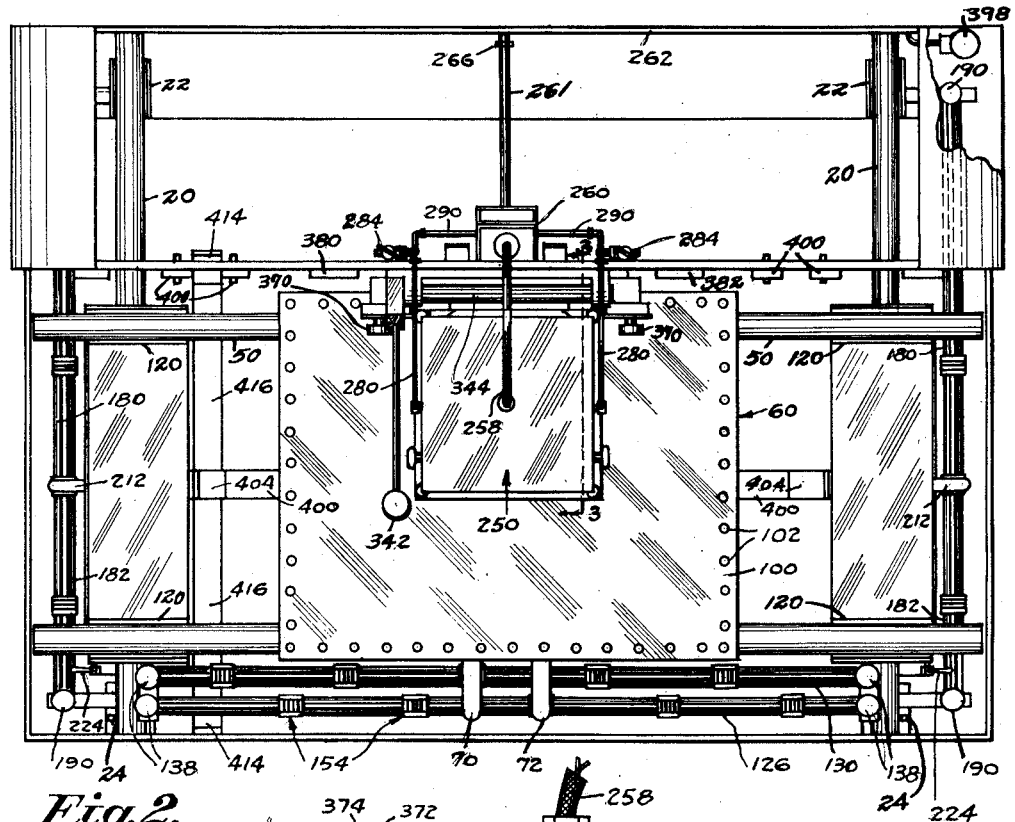
Figure 2 is a top plan view of the machine shown in Figure 1, a cover portion thereof being broken away in the upper right-hand corner as shown.

Two further detent supporting rods 180 are provided, one at each end of the platform top 12 and extending from front to rear, as best seen in Figure 2. The detent supporting rods 180 are similar in construction and in cross-section with respect to the rods 126 and 130, being provided with longitudinally extending ridges or keys 182 similar to the ridges 146.

At their ends the rods 180 are provided with narrow end portions 186 similar to the end portions 124 of the rods 126 and 130. Suitable bolts 188 having adjustment handles 190 are provided for securing the narrow end portions 186 to clamp blocks 192. The latter are secured to the platform 12 by vertical bolts 193 therethrough. Each block 192 is provided with a ledge 194 for overlapping and holding the adjacent rail block 22.

The detent supporting rods 180 are provided each with a plurality of detents 154 similar to those above described.

The rods 180 are disposed in parallelism with respect to each other and at a right angle with respect to the rods 126 and 130.

The framework 40 is provided with two parallel shafts 200 at its ends which are rotatably secured thereto in suitable mountings 210. The shafts 200 are each provided with a locking dog arm 212 similar in all respects to the locking dog arms 70 and 72 previously described, and having downwardly protruding dogs 214 secured to the undersides of the outer ends thereof. The dog arms 212 are preferably each provided with a transversely extending opening therethrough which the shaft 210 extends.

Each arm 212 is preferably provided with a set screw 216 for adjusting the position of the arm 212 longitudinally of its respective shaft 200. At the forward end of each of the shafts 200 the latter are provided with transversely extending throw arms 220 each secured thereto by one of two suitable fittings 224.

The purpose of the levers 224 is to provide a convenient means for throwing the dogs 214 into and out of engagement with the recesses 166 of the detents 154.

As a summary, the above described mechanism generally includes a bed plate 60 and various mechanisms for selectively positioning the bed plate upon the platform 12.

The invention further includes a lamphouse or negative photographic material holder generally indicated at 250. The lamphouse 250 is provided with an outer cover 252. The interior of the lamphouse is best described in the applicants' co-pending patent application titled Printing Apparatus, application No. 765,400, filed August 1, 1947, now Patent Number 2,588,385 dated March 11, 1952.

Figure 3:
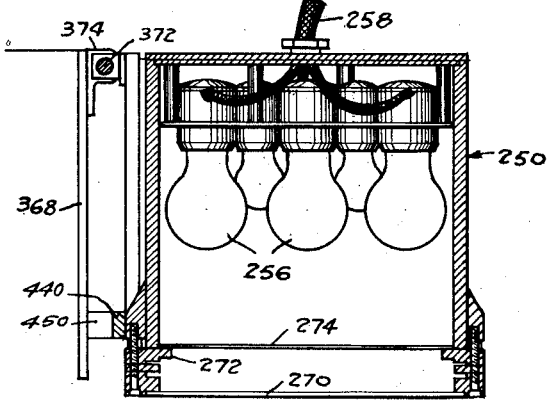
Figure 3 is a view-in-section taken along the line 3—3 of Figure 2.

The construction of the lamphouse is also shown in Figure 3, in which it will be seen that in the upper portion of the interior thereof, a plurality of electric light bulbs 256 are mounted having a flexible power supply wire 258 leading outwardly of the upper side of the lamphouse and extending rearwardly to a source of power supply in communication with a transformer 260. Another supply wire 261 extends from the transformer 260 to a rearward wall 262 of the frame 10. At the said rearward wall the supply wire 258 is provided with a fitting 266 into which a suitable cord may be plugged for connecting the same with a conventional 110 volt circuit.

The lamphouse 250 is provided at its lower end with a glass plate 270 against the underside of which negative photographic material may be placed. The lamphouse 250 also has a ledge 272 extending around the interior thereof and spaced upwardly from the glass 270 for supporting a light diffusing piece of Celluloid or glass 274. As described in the above mentioned co-pending application, means are provided for drawing a vacuum on a recess, not shown, which extends around the glass plate 270. Part of the said mechanism is shown in the present case, as best seen in Figure 4, including a vacuum line 280 which is disposed in communication with the said recess, not shown.

The vacuum line 280 is flexible and extends upwardly and rearwardly through couplings 282 and through a valve 284 and through a vacuum pipe 290 to a vacuum tank 292. The vacuum tank 292 is mounted upon a suitable framework 296, which latter is itself disposed resting upon the floor 295 upon which the frame 10 is also disposed. The framework 296 and tank 292 are independent of the frame 10. The tank 292 is provided with an exhaust pipe 300 which leads to an exhaust pump 310 which latter is drivably secured by means of a belt 312 and fly wheel 314 to a motor 316 which latter is mounted upon the framework 296.

Figure 4:
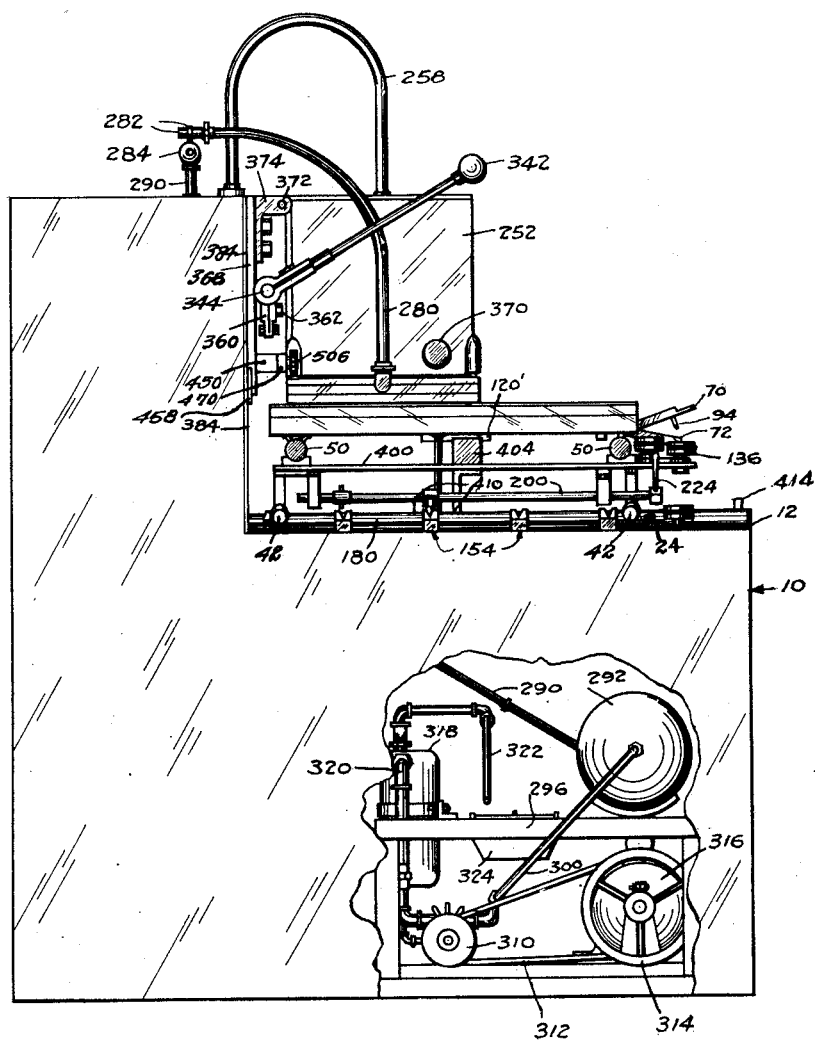
Figure 4 is an end elevation of the machine as seen from the left-hand side thereof as shown in Figure 2, a portion of the housing thereof being broken away to show the air compressing apparatus therein.

As best seen in Figure 4, a moisture collecting device 318 is disposed in connection with the pump 310 through a pipe 320. The device 318 has a water output pipe 322 extending to a water collecting pan 324.

The lamphouse 250 is secured to a track plate 340 on its rearward side in a manner not shown here but described in the above-mentioned co-pending application, and in a manner such that the lamphouse 250 is adapted to move upwardly and downwardly respectively in response to upward and downward movements of a control lever 342 which latter is rigidly secured to a shaft 344. The shaft 344 extends transversely of the lamphouse at the rearward side thereof.

The shaft 344 is provided with means, not shown, for engaging the lamphousing 252 for causing the latter to move upwardly and downwardly with respect to the tracks 240 at times when the latter are in vertical positions.

In accordance with the present invention, an arm 360 is secured to the shaft 344 and extends outwardly from the shaft 344 in a direction transversely disposed with respect thereto.

The arm 360 is looped about the shaft 344 and is provided with parallel ends which are secured together by a suitable bolt 362, for binding the looped portion of the arm 360 to the shaft 344. The purpose of the arm 360 is to engage an adjacent side of the frame 10 to prevent excessive downward movements of the lamphouse 252 for reducing wear upon the top of the bed plate.

A set screw 366 is provided in the outer end of the arm 360 for engaging an adjacent panel plate 368 secured to a panel of the frame 10 to form adjustable means for regulating the desired stopping position of the lamphouse during downward movements thereof.

The lamphouse 252 is further provided with suitable lifting handles 370 for facilitating a swinging thereof on the pivot pin 372 of the bracket 374.

The photo printing device of the invention further includes two vacuum gauges 380 and 382 which latter are preferably mounted upon a vertically disposed panel portion 384 of the frame 10. The panel 384 is also provided with a timing clock 386 which is adapted to time automatically the periods during which the light bulbs in the lamphouse are on. On and off switches 388 are also provided on the panel 384 for automatically regulating the lights in the lamphouse.

Red safety lamps are provided and are disposed in desirable positions about the machine. Two such safety lamps are shown at 394 and 396 mounted upon the opposite upper corners of the vertical panel 384. Two other safety lamps 398 are mounted to the rearward and at the outer ends of the bed plate and adjunct mechanism. Suitable switches 400 are provided conveniently arranged on the panel 384 for controlling the safety lamps 394, 396 and 398. The lamps are red in color for avoiding damage to the photographic material employed. Red safety lights are needed because the photo printing machine of the invention is adapted to be used in a dark room.

Means are provided for preventing the bed plate 60 and the framework 40 from rolling off the ends of their respective rails, such means includes a stop bar 400 secured to the frame 40 and extending longitudinally of the elongated bed plate 60. The bar 400 is provided with a pair of sideways motion stops 404 at each end thereof for engaging the stop engaging portions 120' of the bed plate bracket 118'.

The bar 400 is further provided with two stop engaging members 410 disposed longitudinally therebeneath for engaging stops 414 of a second stop bar 416.

The stops 414 are disposed, one each, at the opposite ends of the bar 416 and the bar 416 is secured to the frame 10 transversely of the elongated bed plate 60.

Means are provided for securing the bottom of the lamphouse to the panel 384. Such means includes a bar 440 which extends horizontally across the back of the lamphouse as best shown in Figure 12. The bar 440 is secured to the lamphouse by means of suitable bolts 442. Between the bar 440 and the backside of the lamphouse 250, a spacer bar 446 is provided. As thus described, bolts 442, one of which is shown in dotted lines in Figure 12, are disposed through the bar 440, and the plate 446 and secure the said bar and plate to the backside of the lamphouse 250.

The bar 440 is adapted to fit snugly against the machined walls of a recess 448 of a receiving member 450.

The member 450 extends transversely across the back of the lamphouse 250 extending outwardly of the sides thereof. The receiving member 450 is itself secured by countersunk bolts 454, shown in dotted lines in Figure 12, to the panel plate 368 which latter is mounted upon the front of the panel 384 between two positioning members 458.

The member 450 is provided at each end with an outer surface 460 disposed in a plane with the outer surface 464 of the bar 440 at times when the latter is disposed in the recess 448.

Against each outer surface 460 a lug 470 is disposed, the lugs 470 having flat surfaces for engaging the flat surfaces 460.

The lugs 470 are each elongated and each provided with an elongated slot 476 extending lengthwise thereof and of a size for receiving snugly a bolt-post 478 which latter is threadedly secured to the member 450 and protrudes between the walls of the slot 476 thereof.

A screw 500 is provided, and extends through the slot 476. The inner end of the screw 500 is threaded and is threadedly secured to the walls of a recess indicated at 502, as indicated in dotted lines in Figure 12. The screw 500 is provided with a shoulder portion 504 which latter is of a diameter larger than the width of the slot 476.

Outwardly of the shoulder 504 a knurled knob 506 is provided so that at times when it is desired to force the lug 470 against the bar 440, for holding the lamphouse 250 in position, the knob 506 is rotated for forcing the shoulder portion 504 against the lug 470.

When it is desired to release the lamphouse 250, the knob 506 is rotated in a direction away from the lug 470 so that the lug 470 may be slid to the left about the bolt 478 and the screw 500 for releasing the bar 440. The lamphouse 250 is then free to be swung upwardly at its bottom.

In operation, positive photographic material is placed on the underside of the lower glass plate 270 of the lamphouse 250 and the end is held in place there by vacuum as it is described in the applicants' above mentioned co-pending patent application. Positive photographic material is then placed on the top of the bed plate 60 and is held there by vacuum being drawn through the lines 280, and 290, which latter lead to the vacuum tank 292, and at times when the valves 384 are open.

The detent rods 126, 130 and 180 are then placed in the position shown in Figures 1 and 2, the positions of the detents 154 thereon having first been accurately set by other means, not shown, in accordance with the desired positions of images to be reproduced on the positive material from the negative.

The locking dog arms 70 and 72 are then disposed in position for engaging desired ones of the detents 154. The locking dog arms 212 are also placed in engagement with the detents 154 on the detent supporting rod 180 for adjusting the position of the bed plate 60 forwardly and rearwardly beneath the lamphousing 250.

The lamphouse 250 is then pivoted downwardly into a position such that its lower surface is disposed in parallelism with the bed plate 60, the lever 242 is then moved downwardly for lowering the lamphouse toward the bed plate 60. This movement of the lever 342 is arrested by the arm 360 at the time when the bolt 366 engages the panel 384. The most desirable adjustment of the bolt 366 will vary in accordance with the thickness of photographic material employed.

The timing mechanism 386 is then set for regulating the length of time the bulbs in the lamphouse are illuminated and one of the switches 388 is thrown for turning the bulbs on.

After the desired period of exposure time has passed, the timing mechanism 386 will turn off the lights 256 and the operator can shift the bed plate 60 into the next position lowering a desired one of the dogs 94 into engagement with a certain desired detent 154.

This process of step-and-repeat can be followed for producing a row of images across the bed plate.

Should it be found, as an end of the positive material is approached, that there is space remaining insufficient for a further image, another image may be placed in the space by placing the image in a position disposed at a right angle with respect to the other images just previously reproduced. The saving of paper is facilitated through the use of an extra detent supporting rod disposed both transversely and longitudinally of the machine.

In order to place an image on the positive material in a direction transverse with respect to the position of the images previously imprinted, the negative material on the lamphouse is rotated 90 degrees and replaced thereon. The aligning of the bed plate for such transverse imprinting is done through the employment of the other two detent supporting rods which latter were not used in the first reproducing. For this purpose, the said other two detent rods, one at an end and one at the front of the device, are adjusted previous to operation.

This invention has provided a photographic reproduction machine which is automatically timed; which is adapted to reduce waste of photographic material to a minimum; which may be easily and accurately adjusted; the lamphouse of which may be lowered into accurate position without danger of bumping the bed plate; the various positions of the bed plate thereof with respect to the lamphouse being accurately predeterminable by a precision spacing of detents; in the use of which the motions necessary to changing the relative positions of the bed plate with respect to the lamphouse can all be made by an operator from the front of the machine; which is provided with means for setting the lower portion of the lamphouse into exact parallelism with the top of the bed plate; and which is provided with safety lights in the most desirable positions.

From the foregoing description, it is thought to be obvious that a photo printing apparatus constructed in accordance with our invention is particularly well adapted for use by reason of the convenience and facility with which it may be assembled and operated, and it will also be obvious that our invention is susceptible of some change and modification including variations in the shape and size of the parts, without departing from the principles and spirit thereof and for this reason, we do not wish to be understood as limiting ourselves to the precise arrangement and formation of the several parts herein shown in carrying out our invention in practice, except as claimed.

We claim:

1. In a contact printing machine, the combination which comprises a mounting frame, a pair of spaced transversely disposed rails mounted in said frame, transversely disposed detent supporting rods having longitudinally positioned keys thereon also mounted in the mounting frame, spaced from and parallel to the said rails, carriage plates mounted to travel on said transversely disposed rails, spaced longitudinally disposed tracks carried by said carriage plates, a horizontally disposed bed plate mounted to travel on said tracks, a plurality of spaced detent supporting longitudinally disposed rods having longitudinally disposed keys thereon spaced from, parallel to, and positioned adjacent to one of said longitudinally disposed tracks, spacing blocks having slots therein adjustably mounted on the said transversely and longitudinally disposed rods, respectively, said blocks having keyways therein for receiving the keys of the rods for positioning the blocks with the slots therein extended upwardly, arms having dogs depending therefrom pivotally mounted on the under surfaces of the bed plate and carriage plates, respectively, and toggle acting arms pivotally connected to the said arms and plates and positioned to pass over dead center with the dogs in the slots of the blocks for retaining the said dogs in locking engagement with the said spacing blocks and also in positions spaced from the said spacing blocks.

2. In a contact printing machine, the combination which comprises a mounting frame, a pair of spaced transversely disposed rails mounted in said frame, transversely disposed detent supporting rods having longitudinally positioned keys thereon also mounted in the mounting frame, spaced from and parallel to the said rails, carriage plates mounted to travel on said transversely disposed rails, spaced longitudinally disposed tracks carried by said carriage plates, a horizontally disposed bed plate mounted to travel on said tracks, a plurality of the said rods having longitudinally disposed keys thereon spaced from, parallel to and positioned adjacent to one of said longitudinally disposed tracks, spacing blocks having substantially V-shape slots therein adjustably mounted on the said transversely and longitudinally disposed rods, respectively, said blocks having keyways therein for receiving the keys of the rods for positioning the blocks with the V-shape slots therein extended upwardly, arms having dogs depending therefrom pivotally mounted on the under surfaces of the bed plate and carriage plates respectively, the dogs of the arms pivotally mounted on the under surface of the bed plate being positioned at different distances from the pivotal mounting means to correspond with the spacing blocks of the rods, and toggle acting arms pivotally connected to the said arms and plates and positioned to pass over dead center with the dogs in the V-shape slots of the blocks for retaining the said dogs in locking engagement with the said spacing blocks and also in positions spaced from the said spacing blocks.

3. In a contact printing machine, the combination which comprises a mounting frame, a pair of spaced transversely disposed rails mounted in said frame, transversely disposed detent supporting rods having longitudinally positioned keys thereon also mounted in the mounting frame, spaced from and parallel to the said rails, carriage plates mounted to travel on said transversely disposed rails, spaced longitudinally disposed tracks carried by said carriage plates, a horizontally disposed bed plate having a vacuum chamber therein with rows of apertures extended from the chamber through the face of the plate mounted to travel on said tracks, a light housing positioned above said bed plate, said light housing having a continuous vacuum chamber extended around the lower end with rows of apertures extended from the chamber through the lower end of the housing, a plurality of the said rods having longitudinally disposed keys thereon spaced from, parallel to, and positioned adjacent to one of said longitudinally disposed tracks, spacing blocks having substantially V-shape slots therein adjustably mounted on the said transversely and longitudinally disposed rods, respectively, said blocks having keyways therein for receiving the keys of the rods for positioning the blocks with the V-shape slots therein extended upwardly, arms having dogs depending therefrom pivotally mounted on the under surfaces of the bed plate and carriage plates respectively, toggle acting arms pivotally connected to the said arms and plates and positioned to pass over dead center with the dogs in the V-shape slots of the blocks for retaining the said dogs in locking engagement with the said spacing blocks and also in positions spaced from the said spacing blocks, means retaining image bearing and receiving matter on the upper surface of the bed plate and under surface of the light housing, means for elevating the light housing, and means pivotally mounting the light housing whereby the housing is rotatable through an angle of 90°.

4. In a contact printing machine, the combination which comprises a mounting frame, a pair of spaced transversely disposed rails mounted in said frame, transversely disposed detent block supporting rods removably mounted in the frame, spaced from and positioned parallel to the said rails, a carriage including spaced parallel tracks longitudinally positioned in said frame and carried by transversely disposed plates mounted for longitudinal travel on said transversely disposed rails, spaced longitudinally disposed parallel detent block supporting rods mounted in the frame and spaced from and parallel to one of said tracks, a bed plate mounted in the frame and positioned to travel longitudinally on said tracks, detent blocks with transversely positioned substantially V-shape slots in the upper surfaces adjustably mounted on the said transverse and longitudinally disposed detent block supporting rods, levers having locking dogs extended from the under surfaces pivotally mounted on the under surfaces of the bed plate and transversely disposed plates of the carriage, toggle acting levers extended from the pivotally mounted levers, and springs coacting with the toggle acting levers for retaining the levers over dead center for holding the dogs in the slots of the detent blocks and also for holding the levers with the dogs spaced from the detent blocks.

HERMAN H. HILLMER.
HENRY P. ORENT.

REFERENCES CITED

The following references are of record in the file of this patent:

UNITED STATES PATENTS

| Number | Name | Date |
|---|---|---|
| 601,882 | Schwarz | Apr. 5, 1898 |
| 1,096,640 | Noetzel | May 12, 1914 |
| 1,471,672 | Wehli | Oct. 25, 1923 |
| 1,647,246 | Ogden | Nov. 1, 1927 |
| 1,787,662 | Boedicker | Jan. 6, 1931 |
| 2,049,557 | Cooper et al. | Aug. 4, 1936 |
| 2,200,365 | Nickelsberg | May 14, 1940 |

FOREIGN PATENTS

| Number | Country | Date |
|---|---|---|
| 173,116 | Great Britain | Dec. 29, 1921 |
| 528,088 | Germany | June 25, 1931 |